June 3, 1930.　　　J. A. HOEGGER　　　1,761,393
SHAVING MIRROR
Filed Feb. 16, 1929　　2 Sheets-Sheet 1
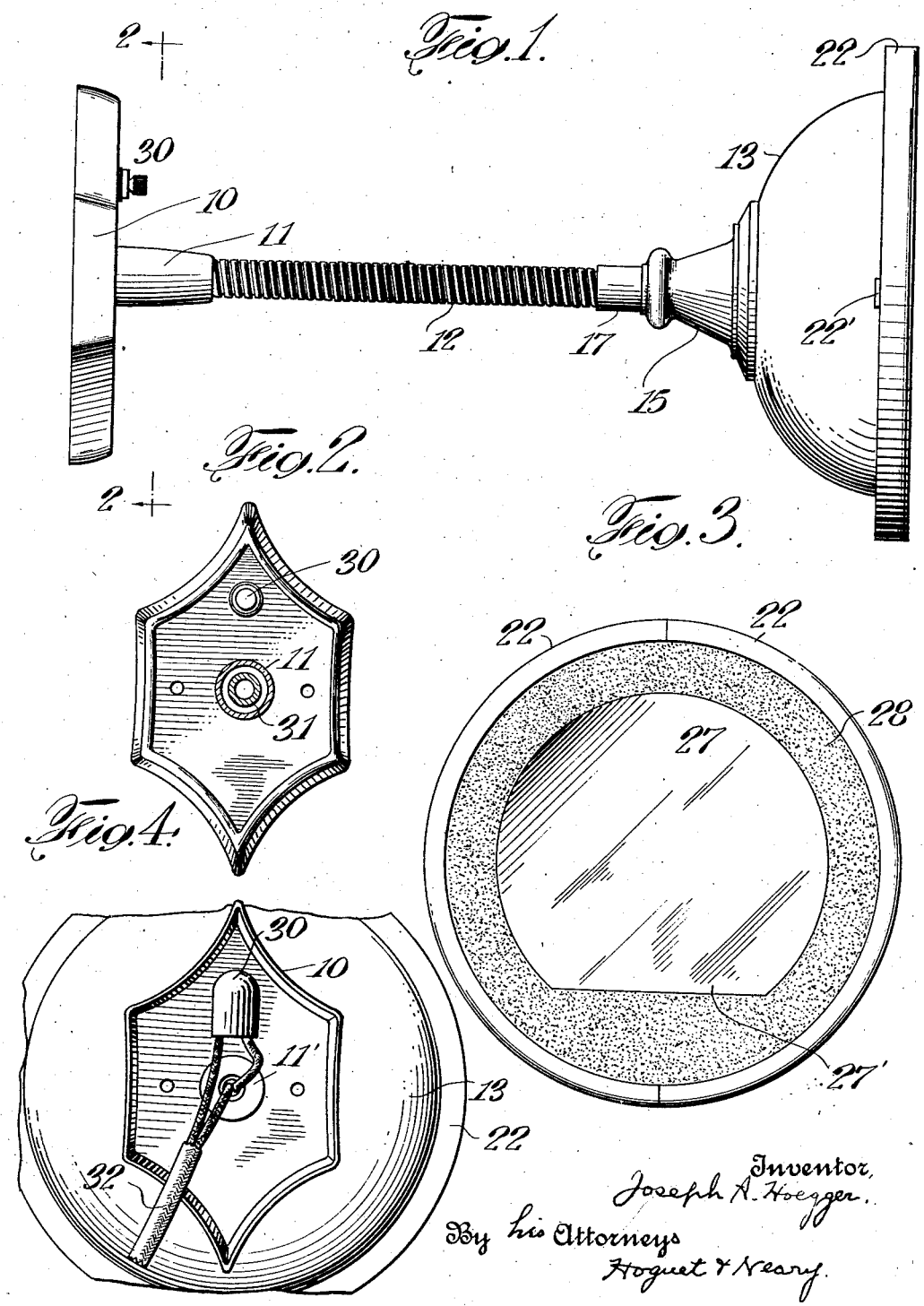

June 3, 1930.  J. A. HOEGGER  1,761,393
SHAVING MIRROR
Filed Feb. 16, 1929  2 Sheets-Sheet 2
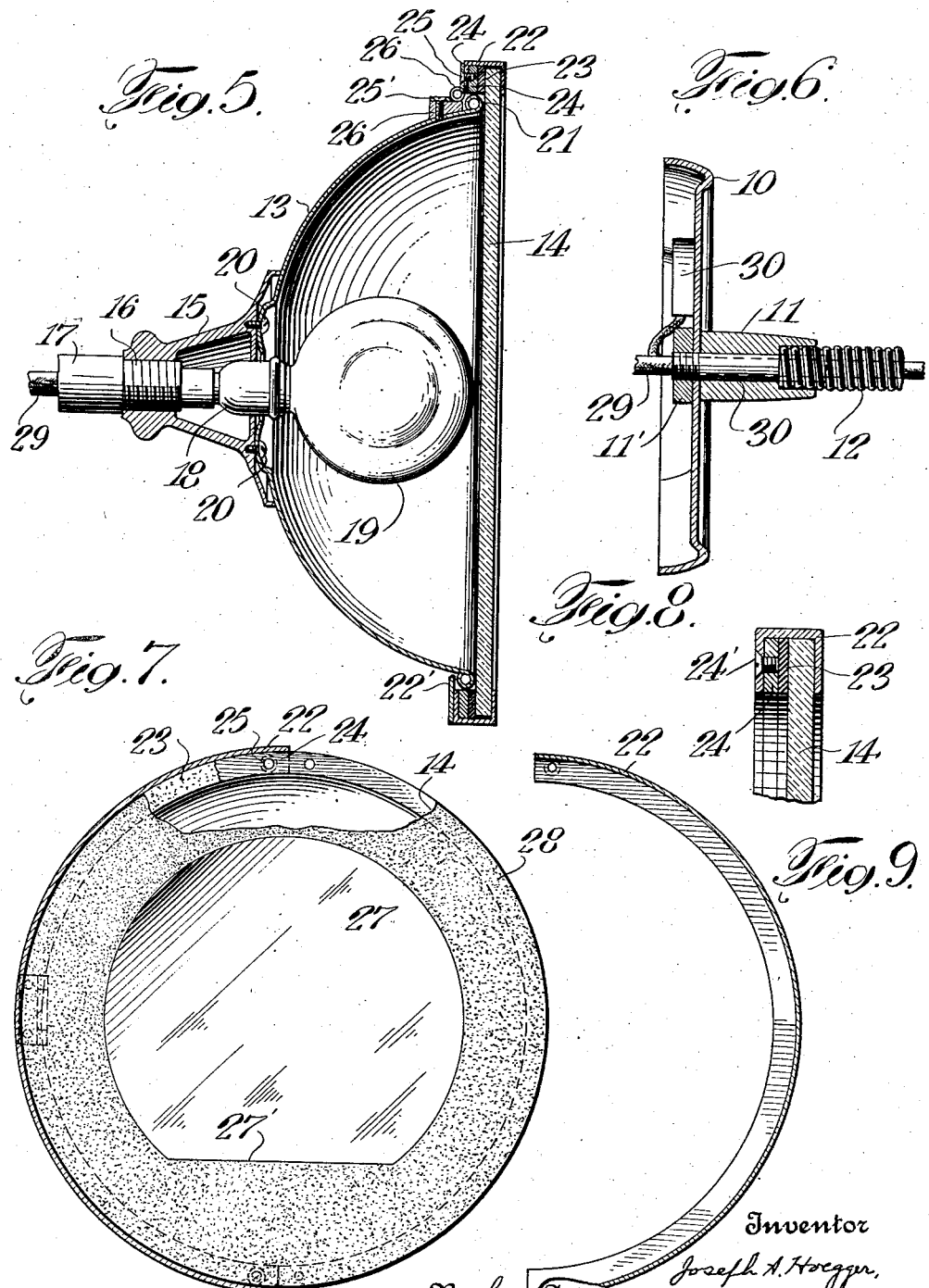

Patented June 3, 1930

1,761,393

UNITED STATES PATENT OFFICE

JOSEPH A. HOEGGER, OF JERSEY CITY, NEW JERSEY

SHAVING MIRROR

Application filed February 16, 1929. Serial No. 340,356.

My invention relates to improvements in shaving mirrors and the object of my invention is to produce a mirror of this kind which is convenient to use and of such a structure that it is attractive in appearance.

The invention is also intended to produce a mirror which can be attached to a wall, which is illuminated by means of a lamp in a casing behind it, and which can be adjusted by merely pushing it to the position desired and will retain its position and thus be able to throw its light and reflect the image to the best possible advantage.

The invention is also intended to produce a structure which is very simple and which will perfectly serve the purpose of getting the best and most effective reflection and which, while termed a shaving mirror, can be used of course for other purposes.

Other benefits and objects will appear from the following description and accompanying drawings in which like reference characters refer to similar parts throughout the several views.

Figure 1 is a side elevation of the mirror embodying my invention;

Figure 2 is a cross section on the line 2—2 of Figure 1;

Figure 3 is a face view of the mirror;

Figure 4 is a broken rear elevation of the structure as a whole;

Figure 5 is an enlarged cross section through the mirror and lamp casing behind it;

Figure 6 is a vertical section through the supporting frame and its connecting parts;

Figure 7 is a broken front elevation of the mirror;

Figure 8 is a broken detail section through a part of the mirror and frame; and

Figure 9 is a broken sectional detail of a part of the channel frame which borders the mirror.

The structure as a whole is carried by a wall bracket 10 which, as illustrated, is hollow and in practice should be made of an attractive design, though of course this does not affect its patentability. Projecting from the face of the shaft is a supporting member 11 which carries a flexible shaft or stem 12 and this, at its outer end, carries the lamp casing 13 which merges into the frame of the mirror 14. These parts will be referred to more specifically. The stem 12 is the conventional flexible shaft which is made tubular and which is well known in the trade. The type which I use is that which can be readily bent to the desired shape or angle and will stay in the shape put until it is changed.

The stem at its outer end connects with a generally conical bracket 15 which has a screw threaded connection 16 (see Figure 5) with a ferrule 17 at the outer end of the stem 12. Within the bracket 15 and connected with the end of the stem 12 is a lamp fixture or socket 18 which carries the lamp 19 and this is the preferred type of electric lamp. The connection is through the stem 12 which is not a new feature in electrical connections.

The lamp casing 13 is nearly semispherical but can be of other shapes, but it is of necessity concavo-convex and serves the purpose of a reflector. It can be secured to the bracket 15 in any convenient way and is shown as fastened by screws 20. At its outer edge the casing is provided with a marginal bead 21 which stiffens and gives finish to the edge of the casing and also provides on one side a catch to engage the latch 22' on one part of the channel frame 22 which encircles the mirror 14 and which is hinged to the casing 13, as presently described. The channel frame 22 is, for assembling convenience, made in two parts as shown in Figures 3 and 7, and these when placed together over the edge of the mirror and casing are fastened by short screws 25, although other fastening means can be used. The channel frame carries a pad or backing 23 which can be of leather and with which the inner part of the glass 14 contacts, and this pad is in turn backed by a metallic ring 23 which fits snugly in the channel frame 22 and to which the frame is fastened.

The frame and the glass which it carries are hinged at one side, one hinge butt 24 being fast to the inner or back side of the channel frame and the second butt 25' connecting with the first by a hinge 26 and being secured to a block or similar supporting means 26 which is fast on the casing 13 and is hidden from sight by the raised mirror frame.

The glass 14 of the mirror can be any type having the reflector opaque as usual and having light openings at desired points, but I have found that by having the glass made as shown, and presently described, I get a very nice illumination of the face when the mirror is used and this without any distress to the eyes. As illustrated, the central part 27 of the mirror is opaque and of the usual mirror construction while around the reflecting part 27 is a narrow field 28 of clouded or ground glass through which the light passes. I also find it preferable to have the lower part of the generally circular field cut off as at 27' in Figure 7. This arrangement causes the light to strike the face or object to be reflected in the mirror and the illuminating effect and the consequent reflection are all that could be desired.

The connection with the lamp 19 can be through an ordinary connector 29 which carries the wires and this extends through a thimble 31 in the supporting member 11 and is controlled by a switch 30, the construction of which is, of course, not pertinent to this case. The electrical connections are thus concealed and are not novel. The supply wires for the current can be led through a cable 32 or the like to the back of the bracket 10 as shown in Figure 4. The inner part of the thimble 31 is screw threaded and receives a nut 11' which may be tightened against the face of the bracket 10 so that the supporting member 11 can be drawn firmly against the face of the bracket and will be sufficiently rigid.

When the device is set up it can be illuminated by means of the lamp under the control of the switch and can be placed without the necessity of adjustment at any desired position or angle and will serve perfectly its purpose. Moreover, the structure which I have described and defined can be rendered very attractive in appearance and as structures of this kind are usually in exposed places this is important as a structure which is not of handsome appearance would not be tolerated in such a place even though it were efficient in use.

What I claim is:

1. As an improved article of manufacture, a shaving mirror embodying a rigid supporting element or bracket, a flexible stem connected to the bracket and of a type which retains its flexed position, a hollow bracket detachably secured to the outer end of the stem, a concavo-convex lamp casing seating in the bracket and acting as a reflector and carried by the outer end of said flexible stem, a lamp within the casing, and a mirror door for the casing having a light opening through the edge portion of the door.

2. As an improved article of manufacture, a shaving mirror comprising a rigid wall bracket, a flexible stem projecting from the bracket and of a type which retains its flexed position, a hollow bracket at the free end of the said stem, a concavo-convex lamp casing acting as a reflector and seating in the aforesaid bracket, a lamp within the casing, and a mirror door having a light opening therethrough and acting to close the casing.

In testimony whereof, I have signed my name of this specification this 13th day of Feb., 1929.

JOSEPH A. HOEGGER.